LIGHT VALVE RECORDER WITH LIQUID MEDIUM-CONTAINING TAPE ROLL

Filed Oct. 25, 1963

2 Sheets-Sheet 1

INVENTOR:
CARLYLE S. HERRICK,
BY Frank J. Thompson
HIS ATTORNEY.

Sept. 12, 1967 C. S. HERRICK 3,341,855

LIGHT VALVE RECORDER WITH LIQUID MEDIUM-CONTAINING TAPE ROLL

Filed Oct. 25, 1963 2 Sheets-Sheet 2

INVENTOR:
CARLYLE S. HERRICK,

BY Frank J. Thompson
HIS ATTORNEY.

United States Patent Office 3,341,855

Patented Sept. 12, 1967

3,341,855

LIGHT VALVE RECORDER WITH LIQUID MEDIUM-CONTAINING TAPE ROLL

Carlyle S. Herrick, Alplaus, N.Y., assignor to General Electric Company, a corporation of New York Filed Oct. 25, 1963, Ser. No. 318,946

5 Claims. (Cl. 346—74)

ABSTRACT OF THE DISCLOSURE

In a tape transport arrangement for replenishing a liquid medium in a light valve projector a strip of tape wound in a roll having a pair of raised edges to provide a channel or tube of restricted dimensions to uniformly retain a liquid medium thereon by capillary forces.

Figures 1, 2, 3:
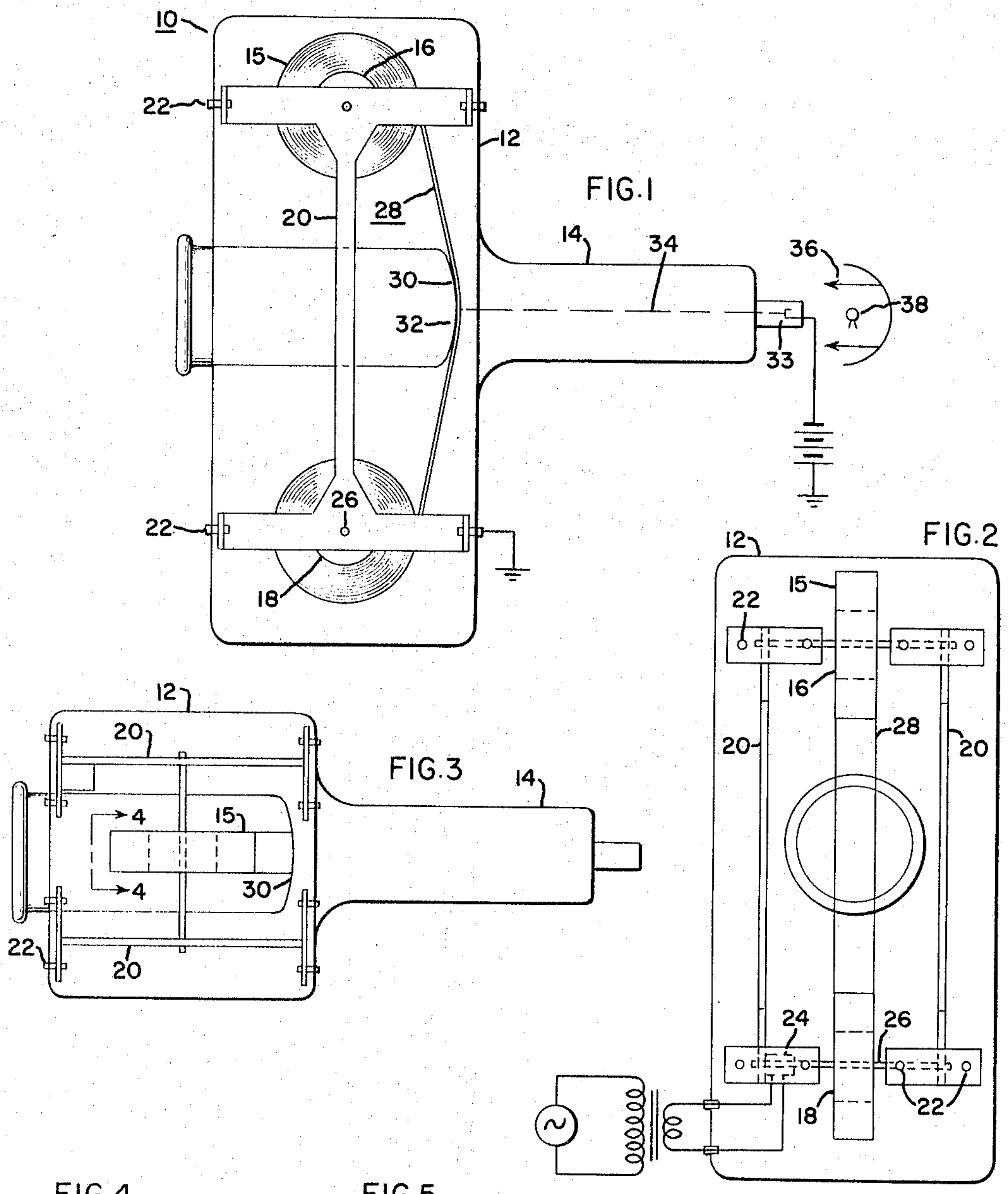

This invention relates to light valve apparatus of the type having a tape transport arrangement for replenishing a deformable medium. The invention relates more particularly to an improvement in the tape transport arrangement.

Light valve arrangements are known wherein an electron beam is modulated and scanned across the surface of a deformable medium in order to form gratings in the medium. Light rays are projected onto the surface of the medium and a schlieren optical system which is also provided projects an image representative of intelligence contained in the modulated electron beam upon a viewing screen.

After repeated bombardment by the electron beam, irradiation damage occurs in the medium. This damage is characterized by the formation of gelations and other chemical modifications in the body of the medium which interfere with faithful reproduction of the image. It has been proposed to continuously replenish the deformable medium by coating the medium upon a strip of tape and causing the tape to be transported through the area of electron beam impingement.

Various forms of the medium have a liquid consistency under normal storage and operating conditions. Prior tape transport arrangements have provided for coating the tape with this type of medium after the tape has been positioned within an envelope of a discharge device for the apparatus. These arrangements generally require a reservoir of the liquid medium positioned within the envelope. The tape transport means have consequently been relatively complex and costly and have required a high degree of care in the handling of the device. In simplifying the complexity of a transport arrangement, it is advantageous to precoat the tape with the liquid medium prior to installation of the tape within the envelope. However, the liquid consistency of the medium presents problems with respect to coating, storing and handling of a precoated tape.

Accordingly, it is an object of the present invention to provide an improved tape transport arrangement for a light valve apparatus.

Another object of this invention is to provide a tape transport arrangement having a precoated tape.

Precoating of the tape includes depositing the deformable medium upon a strip of the tape and forming the strip of tape into an annular roll having overlapping turns. As indicated, the deformable medium has the consistency of a liquid during coating and when the strip of tape is formed into a roll with a tension sufficient to provide a roll having mechanical rigidity, the pressure exerted between adjacent turns causes the medium to be expressed from the roll. As the roll is unwound, the deformable medium is non-uniformly distributed and erratic image reproduction results.

A further object of this invention is to provide an improved supply roll arrangement for a transport tape.

Another object of this invention is to provide a strip of tape having a deformable medium supported thereon and which may be tightly rolled for storage yet inhibits expression of the deformable medium from the roll.

After precoating, the tape is susceptible to unwetting; that is the tape is bared of the medium at segments along its length when the medium is in a liquid state. Unwetting can occur as a result of gravitational force or relatively severe environmental conditions. For example, in certain light valve apparatus, the discharge device is exposed to relatively high temperatures during bake-out and initial evacuation. These high temperatures cause the medium to assume a relatively low viscosity. Under these conditions, drainage of the medium along the tape and unwetting of the tape occurs. Upon cooling of the medium, the medium is unevenly distributed and the quality of reproduced images is consequently poor.

It is another object of this invention to provide a tape transport arrangement wherein unwetting of the tape is inhibited.

Still another object of the present invention is to provide a tape transport arrangement which is adapted to retain uniform distribution of the medium upon the tape during processing of the electron discharge device.

In one form of a light valve projection apparatus, the discharge device includes an output window through which the image being reproduced is projected. During operation of the device, various factors related to the window operate to reduce the fidelity of the reproduced image. For example, vapors generated within the device condense upon the window and cause optical interferences. Further, residual gases of the device permeate an interface space between the tape and window. These gases have an index of refraction which differs from the indices of the tape and window and create further optical interferences.

In one form of tape transport arrangement, the tape is drawn along the window surface and deformations such as scratches are at times created in the surface of the tape by contact between these surfaces. The deformations are greatly magnified by the apparatus and add distortions to the reproduced image.

Another object of this invention is to provide a tape transport arrangement adapted to inhibit condensation of vapors upon the window surface.

Another object of the present invention is to provide a tape transport arrangement adapted to inhibit the residual gases of the device from permeating the space between tape and window surfaces.

Another object of this invention is to provide means for increasing the optical contact between the tape and window surface.

A further object of the present invention is to provide a relatively simple arrangement for introducing into the interface area, a material for increasing optical contact between the tape and the window.

Still another object of this invention is to provide a relatively simple means for inhibiting damage to the tape as it is drawn across a surface of the apparatus.

Another object of the invention is to provide a relatively simple arrangement for supplying a lubricating medium between a surface of the apparatus and the surface of the tape.

In accordance with the present invention, a tape transport arrangement is provided having a supply roll of tape which is adapted to be precoated with a deformable medium prior to installation of the tape within an electron discharge device. The supply roll comprises an elongated strip of tape having first and second edges extending in a generally perpendicular direction away from a first surface of the tape. A deformable medium in a liquid state is deposited along the length of the tape between the extending edges. The medium is deposited in a quantity for substantially filling a channel formed by the tape and the extending edges. The composite transport tape and medium is formed into an annular roll of overlapping turns.

Subsequent to forming the roll, the medium is maintained in position intermediate the turns of the tape by capillary forces exerted between the medium and the surfaces which it contacts. This arrangement thereby permits the tape to be precoated prior to installation in the device and to be wound with a force of sufficient magnitude to contribute mechanical integrity to the roll yet inhibits expression of the medium and unwetting of the tape.

In accordance with another feature of the present invention, the tape transport arrangement is adapted for drawing a second surface of the tape across an output window surface in a light valve apparatus. The supply roll arrangement provides for automatically coating the second surface of the tape with the medium upon unwinding of the tape. The medium on the second tape surface fills the interface area between the window. By this arrangement, the residual gases and condensing vapors are restricted from entering the interface area while the medium lubricates the interface as the tape is drawn across the output window surface.

Figure 4:
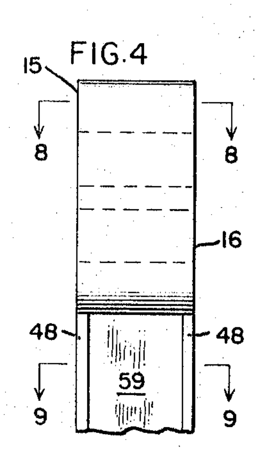
Figure 5:
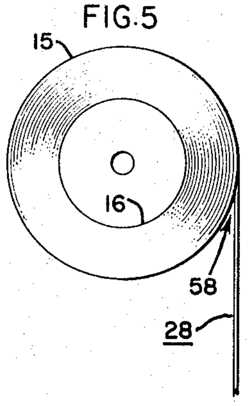
Figure 6:
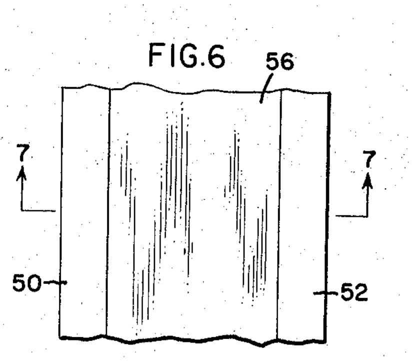
Figure 7:
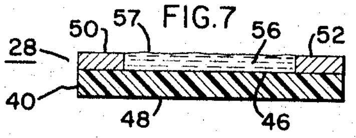
Figure 8:
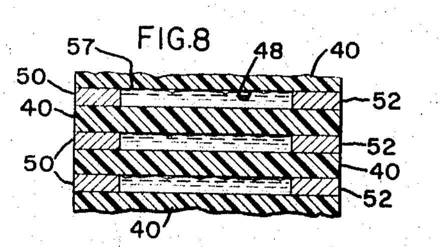
Figure 9:
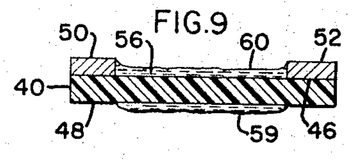
Figure 11:
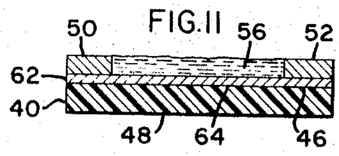
Figure 12:
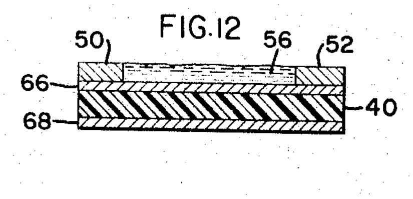
Figure 10:
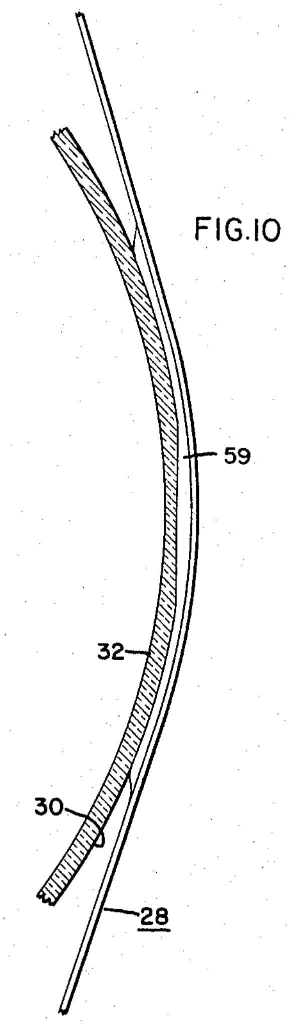

Further objects, features, and the attending advantages of the invention will be apparent with reference to the following specification and drawings in which:

FIGURE 1 is a side view of a form of light valve apparatus illustrating an embodiment of the present invention, FIGURE 2 is a front view of the apparatus of FIGURE 1, FIGURE 3 is a plan view of the apparatus of FIGURE 1, FIGURE 4 is an enlarged view of a tape supply roll of FIGURE 3 taken along lines 4—4 of FIGURE 3, FIGURE 5 is a side view of the supply roll of FIGURE 4 illustrating autmoatic coating of a second surface of the tape upon unwinding of the roll, FIGURE 6 is an enlarged view of a segment of a strip of tape after precoating and prior to forming the tape into an annular roll, FIGURE 7 is a sectional view taken along lines 7—7 of FIGURE 6, FIGURE 8 is a sectional view taken along lines 8—8 of FIGURE 4 illustrating the physical relation of tape, edges and medium in a wound supply roll, FIGURE 9 is a sectional view taken along lines 9—9 of FIGURE 4 and inverted illustrating the deposition of the deformable medium upon unwinding of the tape, FIGURE 10 is a greatly enlarged view of an output window surface of the device of FIGURE 1 illustrating a tape being drawn across the surface, FIGURE 11 is a cross sectional view of another embodiment of the tape arrangement after coating illustrating the use of a film for providing an anode for the device, and FIGURE 12 is a cross sectional view of another embodiment of the tape arrangement after coating and illustrating the use of a film for facilitating wetting of the tape.

In FIGURES 1, 2 and 3, an electron discharge device for a light valve projector is illustrated. Although the present invention will be described with respect to a light valve projector, other forms of light valve apparatus may equally well utilize the various features and advantages of the present invention. The light valve projector apparatus includes an electron discharge device 10 having a mallet shaped evacuated glass envelope including a maul section 12 and a handle section 14. Tape transport means are provided and mounted within the maul section 12. The tape transport means includes a tape supply roll 15 mounted upon a reel 16. The reel 16 and a tape take-up reel 18 are supported within the maul section 12 by brackets 20 which are mounted to the glass wall of the envelope by vacuum sealed rivets 22. An electric motor 24 is coupled to a driving shaft 26 of reel 18 for rotating reel 18 and causing the tape, indicated generally as 28, to be drawn at a relatively slow rate across a surface 30 of an output window 32 for the device.

An electron beam is generated by a cathode electrode 33. The beam is focused and deflected by conventional means, not shown, and which can be mounted in the handle section 14. The electron beam 34 impinges the deformable medium as the medium is transported past the output window 32. Means, not shown, modulate and cause the beam to scan the deformable medium and to generate diffraction gratings in the medium. Light rays 36 from a source 38 are projected onto the deformed medium and a schlieren optical system, not shown, causes an image representative of the modulation intelligence to be projected on an external screen, not shown.

Referring now more particularly to the subject matter of the present invention, the impinging electron beam causes irradiation damage and other chemical modifications to the deformable medium. It is thus advantageous to continuously replenish the medium and in doing so, the medium is precoated upon the tape 28.

In accordance with a feature of the present invention, the supply roll of tape 15 is provided comprising an elongated strip of tape 40 having first and second opposite surfaces, 46 and 48 respectively. The tape and surfaces is best seen in FIGURE 7. First and second edges 50 and 52, respectively, extend outwardly from the first surface 46. The edges may be formed integral with the tape 40 or may comprise members which are positioned on the strip. For example, the members may comprise thin strips of plastic which are secured to the tape by suitable means, such as an adhesive. FIGURES 6, 7, 8, 9, 11 and 12 illustrate the use of separate members mounted upon the tape. A deformable medium 56 in a liquid state is deposited along the length of the tape by any suitable conventional means such as a roll coated apparatus. A sufficient quantity of the medium is deposited on the tape for filling a channel formed by the tape and the extending edges. The medium rises to a surface level 57 which extends to the outermost extremity of edges 50 and 52.

The tape is formed on a reel 16 into an annular roll 15 of overlapping turns as indicated in FIGURES 4, 5 and 8. FIGURE 8 illustrates the relative position of the turns of tape, the edges, and the medium after the roll has been wound. Because the medium fills the channel formed by the tape and rises to the extremities of the edges, the exposed surface 57 of the medium as shown in FIGURE 7 will contact and wet the second surface 48 of an adjacent turn. Relatively strong capillary forces exist between the medium 56 and the surfaces 46 and 48 of the adjacent turn. The surfaces 46 and 48 then are analogous to the wall of a capillary tube of small diameter. The capillary forces maintain the medium in position after the roll is wound and inhibit expression of the medium from the roll or drainage along the tape. Edges 50 and 52 prevent an adjacent surface 48 from pressing upon the medium. The roll formed is a roll having mechanical integrity. The roll may thus be tightly wound to provide mechanical rigidity yet will not express the medium.

Although the medium is maintained in the liquid state upon coating of the tape, the medium may have a relatively steep temperature-viscosity characteristic, and upon coating may assume a relatively high viscosity. The described supply roll arrangement is advantageous for use with these mediums as well as with mediums having a normally fluid viscosity since the same problems exist in forming the tape supply roll with both forms of mediums.

In accordance with another feature of the present invention, the transport arrangement is adapted for drawing the second surface 48 of the strip of tape 40 along the surface 30 of the output window and for introducing the deformable medium into the interface area existing between the surfaces 30 and 48.

As the strip of tape is unwound, a meniscus 58, which is best seen in FIGURE 5, is formed at the interstice where an outer turn of the supply roll departs from the body of the roll. The meniscus results from the hydrostatic forces existing between the medium 56 and the surfaces which the medium contacts. It is effective to coat the surface 48 with the medium. As the tape departs from the body of the roll, the surface 48 is coated with a portion of the deformable medium 56 to provide a coating 59 as indicated in FIGURE 9. The original level 57 in the canal decreases to a final lower level 60 on the unwound tape. The thickness of the coating 59 and the final level 60 may be regulated by varying the thickness of edges 50 and 52.

The tape transport arrangement is adapted for drawing the surface 48 which is coated with the deformable medium along the surface 30. The coating 59 fills the interface between the surfaces 30 and 48. By this arrangement, the gaseous vapors generated within the device as well as residual gases of the evacuated device are restricted from entering the interface space. In addition, the medium which is of fluid consistency upon entering the interface area increases optical contact at the interface and lubricates the passage of the tape across the output window.

A collector electrode which is maintained at a relatively high potential is required for accelerating the electron beam toward the deformable medium. FIGURE 11 illustrates a convenient arrangement for providing this electrode. A film 62 of electrically conductive and transparent material is deposited on the surface 46 along the length of the strip of tape 40. The extending edges 50 and 52 and the medium are positioned upon a surface 64 of the film 62. A relatively high accelerating potential may be coupled between the film 62 and the cathode electrode of the device. Although the width of the film 62 is illustrated as extending across the width of the tape 40, the width may be shorter and edges 50 and 52 may, as previously indicated, be integral with the tape 40 or be deposited upon the surface 46 of the tape.

The elongated strip of tape 40 may comprise a thin strip of transparent polyester material. In one commercial form, the polyester tape has poor surface wetting characteristics when an organic deformable medium such as methyl silicone fluids is utilized. Although the polyester may be modified to provide adequate wetting characteristics, alternatively, it is at times advantageous to provide an intermediate film which provides desirable wetting characteristics. In FIGURE 12, an arrangement is shown which includes films 66 and 68 for providing the desired wetting characteristics. Film 66 may comprise a transparent conductive film similar to film 62 of FIGURE 11 and may form an anode electrode as well as a wetting film. The film 68 may conveniently be fabricated of the same material. A suitable material for films 62, 66 and 68 for use with a polyester strip of tape 40 and an organic medium 56 is a film of deposited indium oxide.

While it will be understood that various other materials may equally well be utilized and that the following details are given by way of example only, the following materials have been found to provide satisfactory operation in the embodiment of the invention as shown in FIGURE 12. The tape 40 comprises a strip of polyester material which is known commercially as Cronar and which has a thickness of 4 mils. The films 66 and 68 comprise indium-oxide having a thickness of 400 Angstrom units and a density of 10 to 13 micrograms per square centimeter of indium—oxidized to about 6000 ohms per square and having an optical transmission of approximately 73%. The deformable medium 56 may comprise methyl silicone fluids. A particular methyl silicone fluid comprises a methylphenyl silicone containing an average of 2 methyl and phenyl groups per silicone atom and in which the mole ratio of methyl groups to silicone atoms is greater than 0 and less than 2.0. The edges 50 and 52 while they may comprise integral extensions of the tape material 40 or even the deposited film 66, may be formed of unitary ribbons of polyvinylacetate which are approximately 20 microns thick. In this particular arrangement, the medium 56 would have a thickness of 20 microns.

Thus a tape transport arrangement has been described whereby a deformable medium may be coated on a tape; the tape may be wound to have sufficient mechanical rigidity and integrity; and the tape may be stored yet the wound roll does not express the medium from between its turns nor does it unwet under severe environmental conditions or after standing for periods of times; and, the roll is adapted to reduce optical interferences, to improve optical contact and to reduce surface damage to the tape.

While I have illustrated and described and have pointed out in the annexed claims certain novel features of my invention, it will be understood that various omissions, substitutions and changes in the forms, and details of the system illustrated may be made by those skilled in the art without departing from the spirit of the invention and the scope of the claims.

What I claim is:

1. In a light valve apparatus having a tape transport arrangement including a supply roll for replenishing a viscous deformable medium, an improved supply roll comprising:

an elongated strip of tape having on a surface thereof first and second protuberances extending outwardly from said surface, said and protuberances arranged to form an elongated channel, the outward extensions of said protuberances being small in relation to the width of said channel, a deformable viscous medium positioned on said tape within said channel, said tape formed into an annular roll of overlapping turns, said surface of said tape and said protuberances being constituted of a material which is wetted by said medium, whereby said medium is uniformly retained in said channel of said roll by capillary forces.

2. The supply roll of claim 1 wherein said tape and said protuberances are constituted of a material which is wetted by said medium and wherein the deformable medium substantially fills the channel whereby said medium is uniformly retained in a tube formed by said one and opposite surfaces of said tape and said protuberances by capillary forces.

3. The supply roll of claim 1 wherein said protuberances are first and second strips of tape secured at first and second opposite edges respectively of said one surface and wherein said medium has a level extending to the upper surfaces of said edges.

4. The supply roll of claim 1 wherein said deformable medium has a liquid consistency.

5. In a light valve apparatus having an electron discharge device including an output window and means for generating and directing an electron beam toward a deformable medium which is positioned between the electron beam generating means and an internal surface of said output window, an arrangement for replenishing the deformable medium in the path of said electron beam and reducing optical interferences comprising:

tape transport means including an elongated strip of tape having on a surface thereof first and second protuberances extending outwardly from said surface, said surface and protuberances arranged to form an elongated channel, the outward extensions of said protuberances being small in relation to the width of said channel, a deformable viscous medium substantially filling said channel, said tape formed into an annular roll of overlapping turns, said surface of said tape and the opposed surface of said tape being constituted of a material which is wetted by said medium, whereby said medium is uniformly retained in said channel of said roll by capillary forces, means for drawing said tape from said supply roll between said output window and said electron beam with said one surface facing said electron beam and the opposite surface of said tape abutting said window, whereby as said tape is unwound from said roll a portion of said medium adheres to said opposed surface and fills the space between said tape and said window and concurrently a desired depth of medium is provided in said channel.

References Cited

UNITED STATES PATENTS

| | | | |
|---|---|---|---|
| 2,391,451 | 12/1945 | Fischer | 340—173 |
| 2,605,352 | 7/1952 | Fischer | 178—7.5 |
| 3,113,179 | 12/1963 | Glenn | 346—74 |

BERNARD KONICK, *Primary Examiner.*

L. H. HILL, *Assistant Examiner.*